(12) United States Patent
O'Donnell et al.

(10) Patent No.: US 9,616,752 B2
(45) Date of Patent: Apr. 11, 2017

(54) ELECTRICAL POWER SUPPLY SYSTEM FOR A MACHINE

(71) Applicant: Caterpillar Inc., Peoria, IL (US)

(72) Inventors: Timothy M. O'Donnell, Germantown Hills, IL (US); Wesley C. Reetz, Washington, IL (US); Eric M. Andris, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 518 days.

(21) Appl. No.: 14/178,439

(22) Filed: Feb. 12, 2014

(65) Prior Publication Data

US 2015/0224879 A1    Aug. 13, 2015

(51) Int. Cl.
*B60L 1/00*    (2006.01)
*B60L 11/08*    (2006.01)

(52) U.S. Cl.
CPC ............... *B60L 1/006* (2013.01); *B60L 11/08* (2013.01); *B60L 2200/40* (2013.01); *Y02T 10/70* (2013.01); *Y02T 10/7077* (2013.01)

(58) Field of Classification Search
CPC ................................. B60L 1/006; B60L 11/08
See application file for complete search history.

(56) References Cited

U.S. PATENT DOCUMENTS

| 5,563,451 | A | 10/1996 | Furukawa |
| 6,107,691 | A | 8/2000 | Gore et al. |
| 7,658,249 | B2 | 2/2010 | Buglione et al. |
| 7,673,713 | B2 * | 3/2010 | Betz ......................... B60L 1/003 180/65.1 |
| 7,952,225 | B2 | 5/2011 | Reichard et al. |
| 8,074,754 | B2 | 12/2011 | Gouker |
| 8,922,049 | B2 * | 12/2014 | Holland ................ B60L 3/0069 307/9.1 |
| 2009/0309537 | A1 * | 12/2009 | Saito ................... B60L 11/1811 320/101 |
| 2011/0253466 | A1 | 10/2011 | Sedoni et al. |
| 2015/0258906 | A1 * | 9/2015 | Ono ...................... H01R 13/447 307/9.1 |
| 2016/0023562 | A1 * | 1/2016 | Parra Ortiz ......... B60L 11/1824 320/109 |

FOREIGN PATENT DOCUMENTS

| CA | 964892 | 3/1975 |
| DE | 29711058 | 8/1997 |
| GB | 875365 | 8/1961 |
| JP | WO 2014020715 A1 * | 2/2014 ........... H01R 13/447 |

* cited by examiner

*Primary Examiner* — Daniel Cavallari

(57) ABSTRACT

An electrical power supply system for a machine is provided. The electrical power supply system includes a generator, a primary power converter unit and an auxiliary power converter unit. The primary power converter unit is electrically coupled to the generator. The primary power converter unit includes a rectifier connected to the generator and an inverter electrically connected to the rectifier by a Direct current (DC) link. Further, the auxiliary power converter unit is electrically connected to the DC bus within the primary power converter unit.

5 Claims, 2 Drawing Sheets

ELECTRICAL POWER SUPPLY SYSTEM FOR A MACHINE

TECHNICAL FIELD

The present disclosure generally relates to a machine and in particular relates to an electrical power supply system for the machine.

BACKGROUND

Machines such as, track-type tractors, wheel loaders, haul trucks, and other heavy construction, agriculture, and mining machines are used to perform various tasks such as, digging, dozing, loading, tilling, hauling and other similar tasks. All of these machines have their respective power sources that provide a motive power to these machines to perform these tasks.

In addition to these predefined tasks, there may be additional and different types of tasks that need to be performed at a worksite. These tasks may require many different pieces of equipment that need to be procured and maintained alongside the machines. Transportation and maintenance of the additional equipments may increase the operational cost of the worksite. Therefore, it may be desirable to enhance the functionality and usage of a single machine for multiple purposes within the worksite. However, the type and quality of the power source within each of the machines may not be directly usable for performing these additional tasks.

U.S. Pat. No. 7,673,713 discloses a dual purpose mobile machine. The mobile machine may have a power source configured to propel the mobile machine and generate electrical power for use off-board the mobile machine. The machine may also have a work tool driven by the power source.

SUMMARY

In one aspect of the present disclosure, an electrical power supply system for a machine is provided. The electrical power supply system includes a generator, a primary power converter unit and an auxiliary power converter unit. The primary power converter unit is electrically coupled to the generator. The primary power converter unit includes a rectifier connected to the generator and an inverter electrically connected to the rectifier by a direct current (DC) link. Further, the auxiliary power converter unit is electrically connected to the DC bus within the primary power converter unit.

In another aspect of the present disclosure, a machine is provided. The machine includes a power source, and a generator driven by the power source to produce a first AC voltage output. Further, a primary power converter unit is electrically connected to the generator. The primary power converter unit includes a rectifier configured to convert the first AC voltage output from the generator to a first DC voltage output. The primary power converter unit further includes an inverter electrically connected to the rectifier by a DC bus and configured to convert the first DC voltage output to a second AC voltage output of variable frequency. The machine further includes a set of ground engaging members configured to propel the machine and a motor configured to receive the second AC voltage output of variable frequency from the primary power converter unit and drive the set of ground engaging members. Furthermore, the machine includes an auxiliary power converter unit removably attached to the machine and electrically connected to the DC bus within the primary power converter unit. The auxiliary power converter unit is configured to convert the first DC voltage output from the rectifier to a third AC voltage output of a predefined fixed frequency.

Other features and aspects of this disclosure will be apparent from the following description and the accompanying drawings.

DETAILED DESCRIPTION

Figure 1:
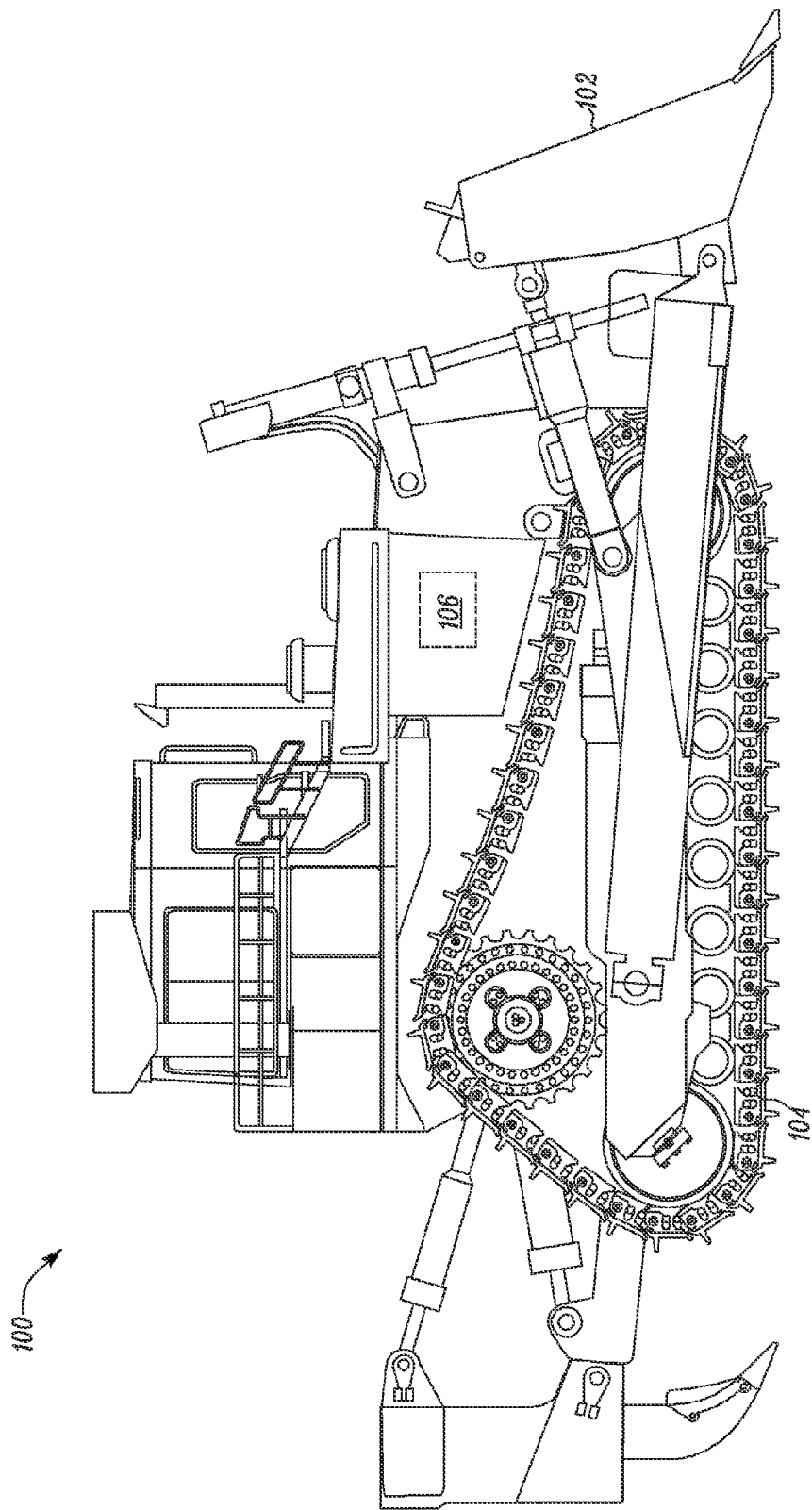
FIG. 1 illustrates an exemplary machine, according to an embodiment of the present disclosure.

The present disclosure relates to a power supply system for a machine. References will now be made in detail to specific embodiments or features, examples of which are illustrated in the accompanying drawings. Wherever possible, the same reference numbers will be used throughout the drawings to refer to the same or like parts. FIG. 1 illustrates an exemplary machine 100. The machine 100 may be a mobile machine that performs some type of operations associated with an industry such as mining, construction, farming, transportation, or any other industry known in the art. In an embodiment, the machine 100 is illustrated as a track type tractor (TTT). In various alternative embodiments, the machine 100 may be any other on-road and off-road machine such as, a backhoe loader, a wheel loader, a compactor, an excavator, a large mining truck, a skid steer loader, or any other agricultural, mining or construction machinery employing wheels or tracks.

The machine 100 includes an implement 102, a set of ground engaging members 104 and an electrical power supply system 106 configured to transmit power output to the implement 102 and the set of ground engaging members 104 in response to an operator input.

The set of ground engaging members 104 may include tracks 104 located on each side of the machine 100 (only one side shown) and configured to propel the machine 100. Alternatively, the set of ground engaging members 104 may include wheels, belts, or other type of traction driven devices.

Figure 2:
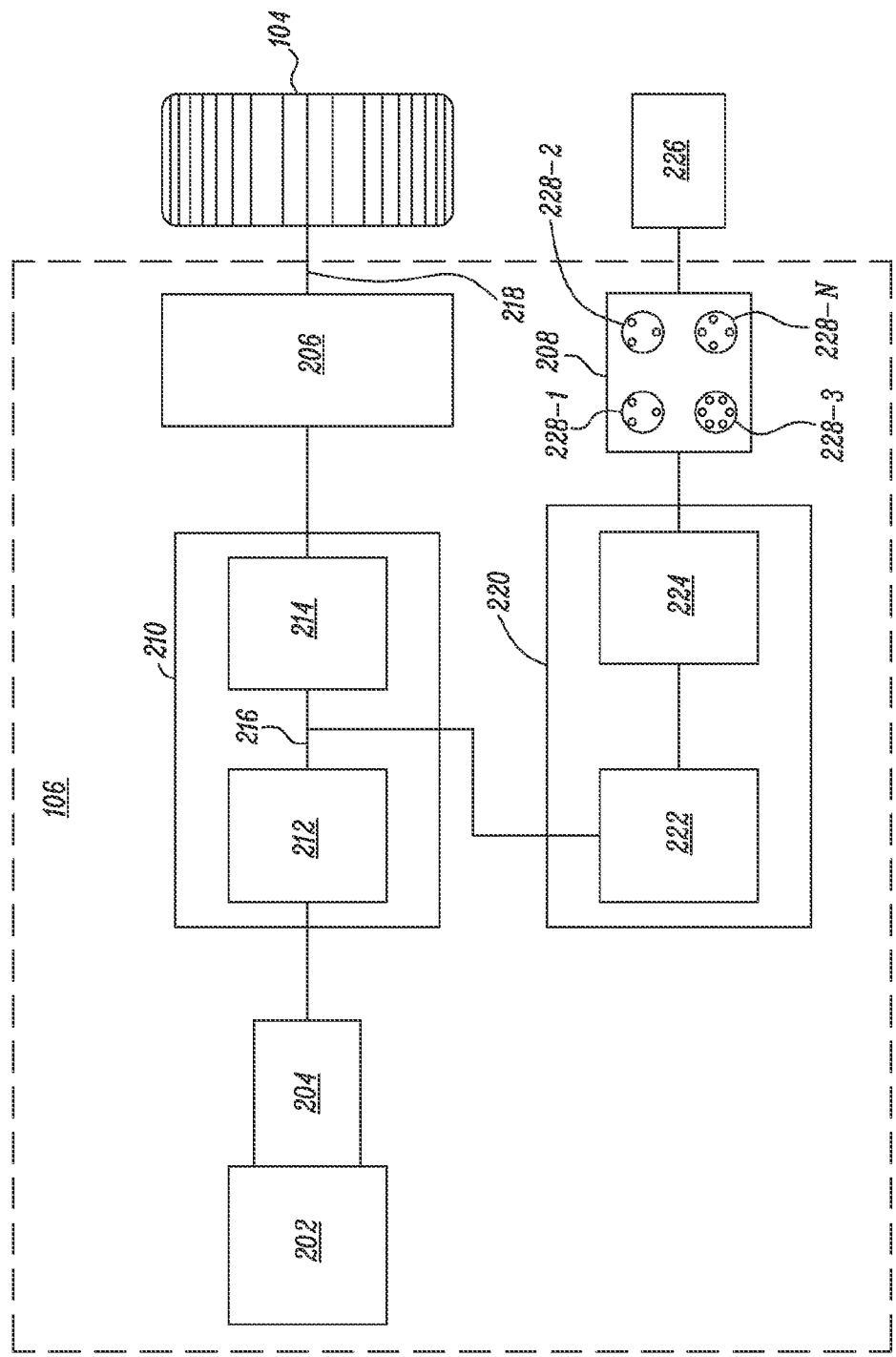
FIG. 2 illustrates a schematic representation of an electrical power supply system for the machine, according to an embodiment of the present disclosure.

FIG. 2 illustrates a schematic representation of the electrical power supply system 106 for the machine 100, according to an embodiment of the present disclosure. It may be contemplated that the electrical power supply system 106 may include multiple components that cooperate to drive the implement 102 and produce an electrical output available both on-board and off-board the machine 100.

The electrical power supply system 106 may include a power source 202, a generator 204, a motor 206 associated with the tracks 104, and an off-board power interface 208. In an exemplary embodiment, the power source 202, the generator 204, the motor 206 and the off-board power interface 208 may be electrically connected as explained in greater detail with respect to the following description.

In an exemplary embodiment, the power source 202 may produce a mechanical power output and include, for example, an internal combustion engine. The internal combustion engine may be a diesel engine, a gasoline engine, a gaseous fuel-powered engine, a turbine engine, or any other type of combustion engine apparent to one skilled in the art, wherein a power output may be directly related to an amount of fuel combusted therein. It is also contemplated that power source 202 may alternatively embody a non-combustion source of power, such as a fuel cell, a battery, or any other source of power known in the art.

Further, the generator 204 may be a three-phase alternating field-type generator configured to produce a first alternating current (AC) voltage output in response to a rotational input from the power source 202. It may be contemplated that the generator 204 may alternatively be a switched reluctance generator, a direct phase generator, or any other appropriate type of generator known in the art. The generator 204 may include a rotor (not shown) rotatably connected to the power source 202 by any means known in the art such as, for example, by a direct crankshaft connection, via a gear train, through a hydraulic circuit, or in any other appropriate manner. The generator 204 may produce electrical power output as the rotor is rotated within a stator (not shown) by the power source 202.

Further, the generator 204 is electrically connected to a primary power converter unit 210. In an exemplary embodiment, the primary power converter unit 210 may include a rectifier 212 and an inverter 214 electrically connected to the rectifier 212 by a direct current (DC) bus 216. For example, the rectifier 212 may be configured to convert the first AC voltage output from the generator 204 to a first DC voltage output. It may be contemplated that the rectifier 212 may control a multi-phase semi conductor arrangement by application of a modulation scheme known in the art.

In an exemplary embodiment, the inverter 214 may be configured to convert the first DC voltage output from the rectifier 212 to a second AC voltage output of variable frequency. It may be contemplated that the second AC voltage output is of variable frequency to facilitate operational demand of the tracks 104, such as while turning.

Furthermore, the DC bus 216 may include positive and negative power conductors that electrically interconnect the rectifier 212 and the motor 206 by way of the inverter 214. The DC bus 216 may also be electrically connected to power storage devices such as batteries (not shown), capacitors (not shown), and other devices known in the art, and/or to accessory power loads to provide power to and remove power from the DC bus 216, if desired.

The motor 206 is configured to receive the second AC voltage output at variable frequency from the inverter 214 to operate the tracks 104. The motor 206 may be a permanent magnet alternating field-type motor configured to receive power from the inverter 214 to drive the tracks 104. It may be contemplated that the motor 206 may alternatively be a switched electric motor, a direct phase motor, or any other appropriate type of motor known in the art. It may also be contemplated that the motor 206 may supply power to the DC bus 216 during a power regeneration event (e.g., when gravity or momentum acting on the tracks 104 drives the motor 206). Although only a single motor 206 is illustrated in FIG. 2, it may be contemplated that multiple motors 206 may be included within the machine 100 in a series or parallel configuration. In addition, the motor 206 may be connected to the tracks 104 through a direct mechanical connection 218 or through an indirection connection (not shown) such as a reducing gear arrangement.

In an embodiment, the electrical power supply system 106 includes an auxiliary power converter unit 220 electrically connected to the DC bus 216 within the primary power converter unit 210. The auxiliary power converter unit 220 may be removably attached to the machine 100. As shown in FIG. 2, the auxiliary power converter unit 220 includes a second inverter 222 configured to be connected to the DC bus 216 between the rectifier 212 and the inverter 214 within the primary power converter unit 210.

In an exemplary embodiment of the present disclosure, the second inverter 222 receives the first DC voltage output from the rectifier 212 via the DC bus 216 and converts it to a third AC voltage output of predefined fixed frequency and magnitude. In an exemplary embodiment, the predefined fixed frequency may be a standard frequency as defined in local operating standards usable by common electrical equipment such as within a range from about 50 Hertz to 65 Hertz. It may be contemplated that the frequency and the magnitude of the third AC voltage output may be configured by an operator of the machine 100 according to the operating standards and in order to adapt it for use with a wide range of standard electrical equipments.

In an exemplary embodiment, the auxiliary power converter unit 220 further includes a harmonic filter unit 224 configured to smoothen the third AC voltage output from the second inverter 222. It may be contemplated that the harmonic filter unit 224 is configured to enhance the power output quality of the third AC voltage output by reducing undesirable harmonic content in the third AC voltage output in order to meet the power quality requirements for electrical loads. The harmonic filter unit 224 may use any circuit arrangement known in the art, such as isolated or non-isolated transformer topologies, or the harmonic filter unit 224 may use the existing on-board or off-board electric windings and/or elements to smoothen the third AC voltage output from the second inverter 222.

The auxiliary power converter unit 220 is further configured to be electrically connected to the off-board power interface 208. The off-board power interface 208 is configured to provide access to the on-board electrical power produced by the generator 204 via the auxiliary inverter 220 for performing one or more utility operations by plugging in one or more on-board or off-board utility modules 226. In an exemplary embodiment, the off-board power interface 208 may include one or more power outlet receptacles 228-1, 228-2, 228-3 . . . 228-n, hereinafter collectively referred to as the power outlet receptacles 228, configured to plug-in utility power modules 226. Example of the off-board utility modules 226 may include a welding module which may be connected to the power outlet receptacles 228 to fetch power from the generator 204 via the auxiliary power converter unit 220.

Alternatively, a single or multiple similar power outlet receptacles may be included within off-board power interface 208. In this situation, as explained previously, the off-board power interface 208 may include a means for the operator to select or otherwise request a particular voltage and/or frequency and/or magnitude of the power supply. In response to the engaged outlet, an off-board power demand, and/or the selected power supply characteristic(s), the power source 202 and/or the generator 204 may be operated to produce a corresponding amount of power, and the auxiliary power converter unit 220 may be operated to appropriately provide the required power to the off-board utility modules 226, as necessary. It may be contemplated that, instead of or in addition to power outlet receptacles 208, manual bolt down lugs may be provided.

INDUSTRIAL APPLICABILITY

The industrial applicability of the electrical power supply system 106 having the auxiliary power converter unit 220 described herein will be readily appreciated from the foregoing discussion.

Generally, different types of machines, such as dozer, haul truck, track-type tractor etc., may perform tasks specific to them, such as dozing, hauling, tilling, etc. A single power source within each of these machines may provide power to these machines to perform these predefined tasks. However, the machine may also need to perform various other tasks which may not be specific to these machines within the worksite. One known way is to utilize the power generated by the generator of the machine for these additional operations when the machine is idle and/or not operating its predefined tasks. In such cases, the power from the generator may be redirected towards the utility modules while the implement and the drivetrain of the machine remain unpowered.

The auxiliary power converter unit 220 and the implement 102 along with the ground engaging members 104 may simultaneously access the power produced by the generator 204 for performing primary machine functions as well as for performing other on-board or off-board utility operations by the machine 100. In an embodiment, the on-board and/or off-board utility modules 226 may be plugged-in to the power outlet receptacles 228 to utilize power generated by the generator 204 of the machine 100 via the auxiliary inverter 220 while the generator 204 provides power to the ground engaging members 104 and the implement 102.

In an embodiment, speed of the power source 202 may be adjusted based on the power output required for the primary functions performed by the machine 100 as well as the power output required by the on-board and/or off-board utility modules 226. Further, the auxiliary power converter unit 220 may be disabled while the machine 100 performs the primary functions and vice-versa. Therefore, the fuel consumption, machine noise, and maintenance costs associated with the machine 100 are reduced.

In an exemplary embodiment, the auxiliary power converter unit 220 may additionally be connected to one or more off-board mobile generator sets and/or one or more additional auxiliary power converter units in parallel to form a micro-grid arrangement. This may result in increased operability of the machine 100 while the fuel consumption, machine emissions, and the maintenance costs are reduced.

Furthermore, the auxiliary power converter unit 220 may also be connected to on-board and/or off-board power storage devices to store the generated power and use it later for machine operations and/or for performing utility functions when the power source 202 does not generate power. Therefore, in this case, the auxiliary power converter unit 220 may recover the power from the on-board and/or off-board power storage devices to perform the utility functions.

In an exemplary application of the machine 100, during a pipe-laying operation, one or more pipes are laid within a trench and welded together. As the machine 100 performs the pipe laying operation, the on-board and/or off-board utility module 226, in this case a welding module may also be plugged in to the power outlet receptacle 228 and the power generated by the generator 204 is also supplied to the welding module via the auxiliary power converter unit 220. In this manner, an additional generator for operating the welding module may not be needed, thereby reducing the operational cost of the pipe laying operation.

In other exemplary applications, the machine 100 may also be used as a worksite power generator, where electrical equipments within the worksite may be plugged in the power outlet receptacles 228 to receive power from the generator 204 of the machine 100 via the auxiliary power converter unit 220.

Additionally, the auxiliary power converter unit 220 may be removable from the machine 100. Therefore, the weight of the machine 100, and/or the auxiliary power converter unit 220 is also not increased, thereby providing a cost efficient manner of transporting the machine 100 and using a single machine 100 for other utility operations within the worksite.

What is claimed is:

1. A machine comprising:
    a power source;
    a generator driven by the power source to produce a first alternating current (AC) voltage output;
    a primary power converter unit electrically connected to the generator, the primary power converter unit including:
        a rectifier configured to convert the first AC voltage output from the generator to a first direct current (DC) voltage output; and
        an inverter electrically coupled to the rectifier by a DC bus and configured to convert the first DC voltage output to a second AC voltage output of variable magnitude and frequency;
    a set of ground engaging members configured to propel the machine;
    a motor configured to receive the second AC voltage output of variable magnitude and frequency from the primary power converter unit and drive the set of ground engaging members; and
    an auxiliary power converter unit removably attached to the machine and electrically connected to the DC bus within the primary power converter unit, the auxiliary power converter unit being configured to convert the first DC voltage output from the rectifier to a third AC voltage output of a predefined fixed magnitude and frequency.

2. The machine of claim 1, wherein the generator is a three-phase alternating field-type generator configured to produce the first AC voltage output in response to a rotational input from the power source.

3. The machine of claim 1, wherein the fixed frequency of the third AC voltage output is within a range from 50 Hertz to 65 Hertz.

4. The machine of claim 1, wherein the auxiliary power converter unit further includes a harmonic filter unit configured to smooth the third AC voltage output in the auxiliary power converter unit.

5. The machine of claim 1, wherein the electrical power supply system includes a power outlet receptacle configured to plug-in one or more off-board utility power modules.

* * * * *